United States Patent [19]

Kromminga et al.

[11] Patent Number: 5,343,958
[45] Date of Patent: Sep. 6, 1994

[54] AGRICULTURAL FERTILIZER APPLICATOR INCLUDING SELF-LEVELING WAGON HITCH

[75] Inventors: Gaylen Kromminga, Morton; William J. Dietrich, Sr.; Dean Knobloch, both of Congerville, all of Ill.

[73] Assignee: DMI, Inc., Goodfield, Ill.

[21] Appl. No.: 907,836

[22] Filed: Jul. 2, 1992

[51] Int. Cl.$^5$ .................................... A01B 59/04
[52] U.S. Cl. .................... 172/680; 172/677; 172/310; 111/925; 280/490.1
[58] Field of Search .............. 172/677, 288, 274, 679, 172/680, 310, 776, 324, 326, 327, 328, 395, 414, 64.5, 68, 452, 467, 474, 501; 280/412, 413, 498, 490.1; 239/149, 160, 164

[56] References Cited

U.S. PATENT DOCUMENTS

| | | | |
|---|---|---|---|
| 2,328,343 | 8/1943 | Jacob | 280/490.1 |
| 2,741,484 | 4/1956 | Fisher et al. | 280/490.1 |
| 3,378,279 | 4/1968 | Jacobs | 172/677 |
| 3,912,018 | 10/1975 | Brundage et al. | 280/490.1 |
| 4,117,892 | 10/1978 | Dietrich, Sr. et al. | 172/310 |
| 4,202,283 | 5/1980 | Wiesbock | 111/925 |
| 4,391,334 | 7/1983 | Carrick | 172/680 |
| 4,406,329 | 9/1983 | Schlueter | 172/310 |
| 4,408,777 | 10/1983 | Carrick | 172/680 |
| 4,677,922 | 7/1987 | Shrull et al. | 172/677 |
| 4,681,335 | 7/1987 | Ledermann et al. | 172/328 |

FOREIGN PATENT DOCUMENTS 476351 10/1953 Italy .................. 280/490.1

Primary Examiner—Randolph A. Reese
Assistant Examiner—Spencer Warnick
Attorney, Agent, or Firm—Emrich & Dithmar

[57] ABSTRACT

An agricultural implement designed for distributing anhydrous ammonia by laterally spaced applicator knives includes an elongated wagon hitch frame which has a forward end pivotally mounted to a forward section of the implement frame and a rear end which carries a drawbar and hitch clevis for a trailing wagon carrying a tank of anhydrous ammonia. As the implement is raised, the rear end of the wagon hitch frame drops away from the implement frame so that the height of the wagon hitch above the ground remains substantially constant and the implement hitch section and wagon tongue remain in line. The break-away coupler for the main hose from the anhydrous tank to the implement is provided with a swing arm to facilitate disconnection of the main hose even when the anhydrous wagon is sharply angled. In the case of a larger implement, having right and left pivoting wings, the frames of the wing sections are strengthened with efficient use of upper and lower laterally spaced channel stiffeners.

6 Claims, 3 Drawing Sheets

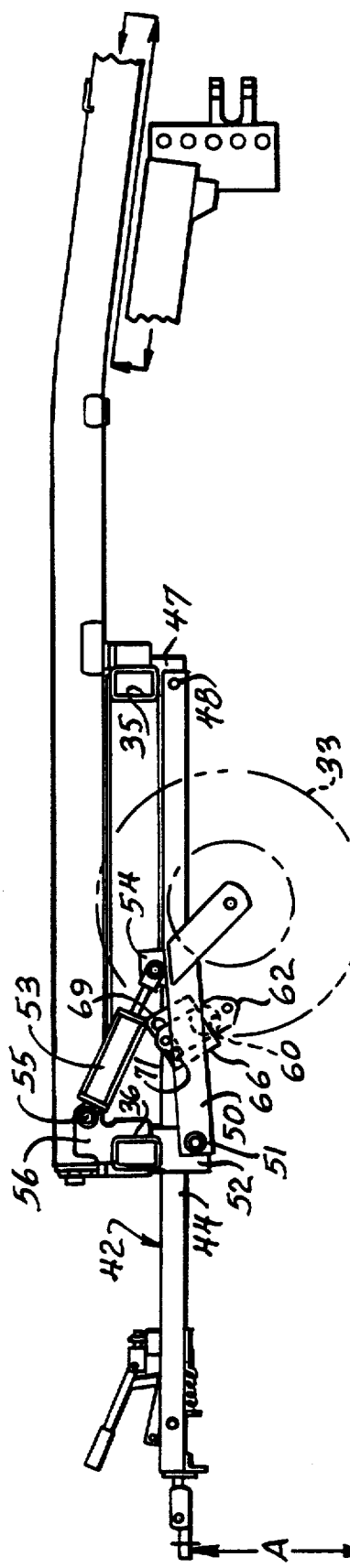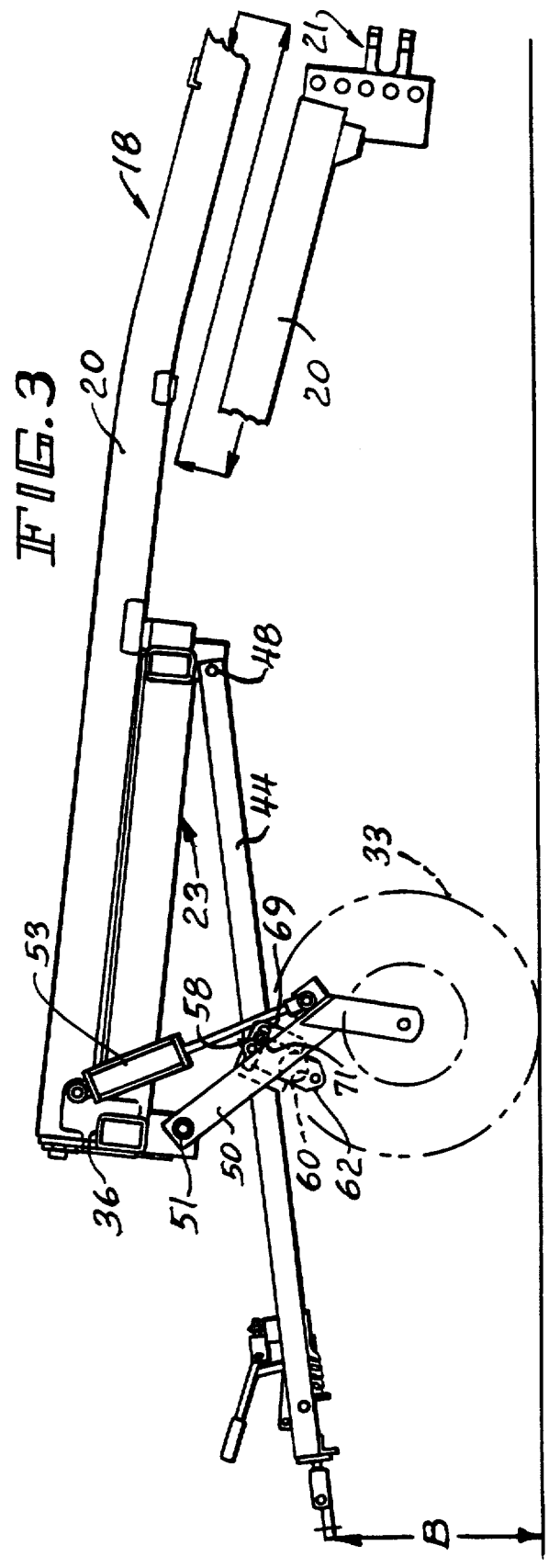

AGRICULTURAL FERTILIZER APPLICATOR INCLUDING SELF-LEVELING WAGON HITCH

FIELD OF THE INVENTION

The present invention relates to agricultural implements, in general; and more particularly, it relates to a fertilizer applicator of the type wherein anhydrous ammonia is deposited in laterally-spaced bands or strips beneath the soil by applicator knives. Typically, a large quantity of liquid anhydrous ammonia is stored under pressure in a tank mounted on a wagon and drawn in tandem behind the implement.

BACKGROUND OF THE INVENTION

Larger implements have been used for some time for applying anhydrous ammonia beneath the soil for crop fertilization. In such implements, individual applicator knives are mounted at regular lateral spacings on a toolbar or wheeled frame drawn by a tractor. One such toolbar or drawn implement frame is shown in Dietrich, Sr., et al U.S. Pat. No. 4,117,892 entitled "Agricultural Folding Toolbar With Rigid Crossframe", issued Oct. 2, 1978. The implement frame in that patent has forward and rear mounting bars for mounting the applicator knives, and the frame folds in the center with the wings extending rearwardly in the transport position. A more conventional frame has a fixed center section which remain in place with side sections or "wings" folding upwardly at the left and right sides of the center section.

When the applicator implement (or simply "applicator", for short) is in use, the knives are embedded in the soil at a uniform depth, generally in the range of six to eight inches; and the ammonia is deposited in the narrow slot formed by the knife. A furrow sealer then follows the knife and closes the slot, covering the ammonia and fixing it in place where it is available as fertilizer.

Individual applicator knives, ammonia distribution hoses and a single-disk furrow closer are shown in Dietrich, Sr., et al U.S. Pat. No. 4,596,199 for "Single Blade Sealer for Fertilizer Applicator", issued Jun. 24, 1986. It is desirable, of course, to cover as wide a swath as possible in a single implement pass to reduce time and to increase operating efficiency. This leads, of course, to larger implements.

When it is desired to transport the implement and the trailing tank/wagon from field to field, or when turning at the end of a row, or in passing over a waterway or swail, it is necessary to raise the implement to disengage the applicator knives from the soil. When the implement is raised, the frame is normally tilted in an upward and rearward direction from the tractor hitch point. In the past, this had the effect of elevating the wagon hitch point, causing the wagon tongue to be inclined upwardly and forwardly and interfering against the forward section of the tank.

SUMMARY OF THE INVENTION

The present invention provides a separate hitch section in the form of a rectangular gate or frame, elongated in the fore and aft direction. The hitch section or frame is pivotally mounted at its front end to a forward section of the implement frame, and its rear end carries the hitch clevis for securing the wagon tongue. The hitch frame is supported at an intermediate location (i.e., between its forward pivot connection to the implement frame and its rear wagon hitch) by a mechanism which permits the rear end of the hitch frame to swing downwardly away from the implement frame in a controlled manner as the implement is raised.

Thus, as the implement is raised, the rear end of the hitch section drops away from the implement frame so that the height of the wagon hitch above the ground when the implement frame is raised remains substantially constant when compared with the hitch height in the use position when the implement frame is lowered. And the implement hitch frame and wagon tongue remain in line, thereby improving the draft line for the wagon in the raised position. This feature is some-times referred to as self-leveling. In addition to improving the draft line, the self-leveling hitch assembly avoids the problem of interference between the wagon tongue and the ammonia tank which, in the past, was particularly pronounced in crossing a waterway because the implement would be traveling uphill and the wagon would be going downhill with its tongue in an elevated position (because the implement is uphill), thereby causing the tongue to interfere with or strike the front end of the tank.

Another improvement of the instant invention is that a swing arm is provided for the section of the anhydrous coupling hose from the break-away connection of the tank hose to the tank distribution system on the implement. In the past, the tank coupling hose extended directly rearwardly from a pressure regulator at the center of the implement frame; and in cases where the implement was turned sharply, such as at the end of a field, the male portion of the break-away coupler, which is attached to the tank hose was pulled sideways, making it difficult to disconnect the tank hose from the implement. With the present invention, as the swing arm rotates toward the wagon, it re-orients the female portion of the break-away coupling to be more directly aligned with the tank hose and it also causes the coupling hose from the regulator to be aligned with the tank hose at the break-away coupler.

The present invention thus permits the hose on the tank and the coupling hose on the implement to remain in better alignment even for the sharpest turns, thus facilitating disconnection of the break-away coupler.

In addition, in the case where the implement has wings, the wing sections are provided with additional strength through the use of laterally displaced channel members, one above the wing frame and one below it, the channel members extending between fore and aft transverse wing frame members to provide a greater strength than either channel member, acting alone, would provide, or if both channel members were used but were vertically aligned.

Other features and advantages of the present invention will be apparent to persons skilled in the art from the following detailed description of a preferred embodiment accompanied by the attached drawing wherein identical reference numerals will refer to like parts in the various views.

BRIEF DESCRIPTION OF THE DRAWING

FIG. 2 is a side view of the implement frame in the lowered or use position, the forward portion of the draft frame being broken away and displaced for brevity;

FIG. 3 is a broken away side view similar to FIG. 2 with the implement frame in the raised or transport position;

DETAILED DESCRIPTION OF A PREFERRED EMBODIMENT

Figure 1:
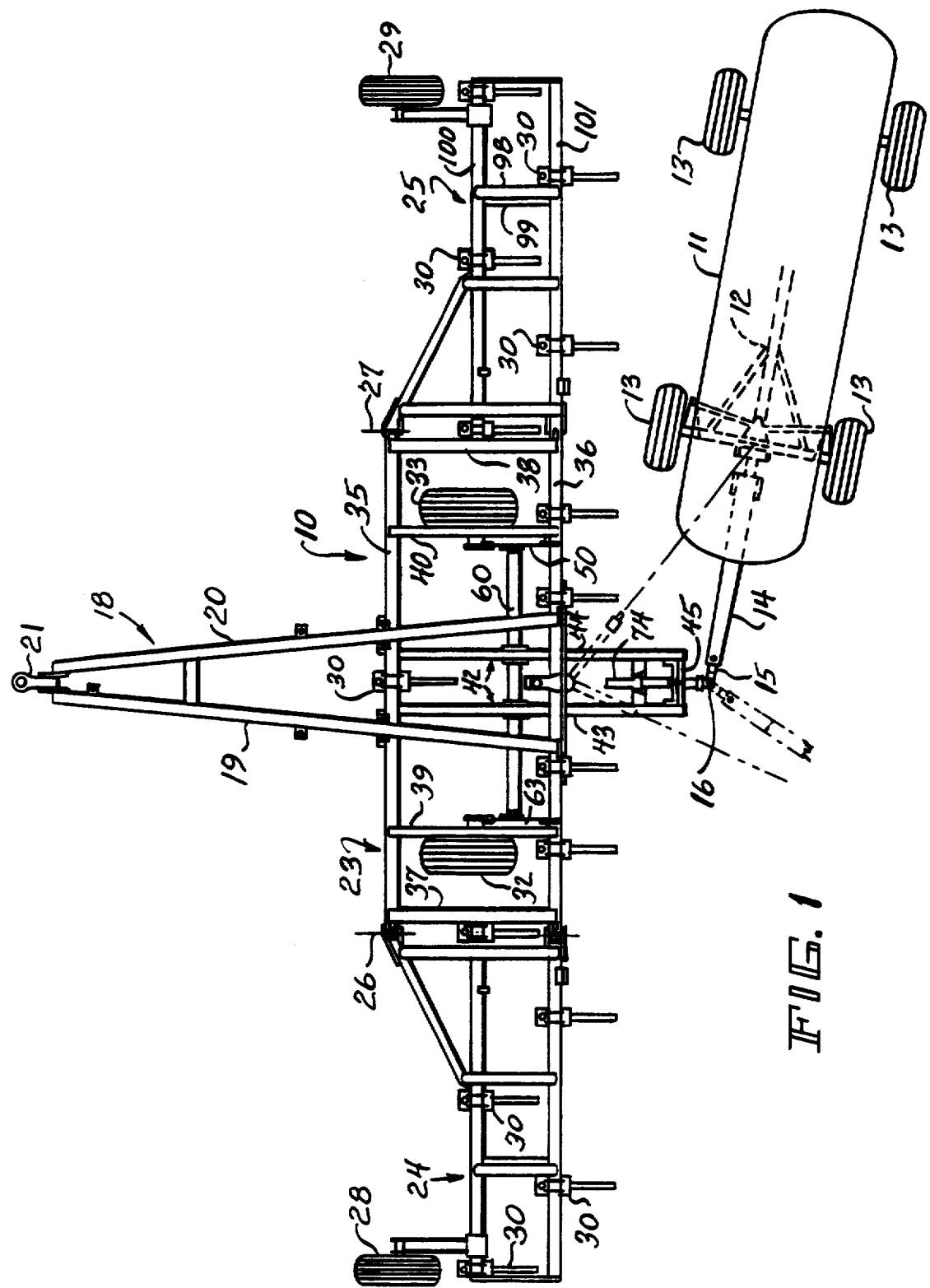
FIG. 1 is a top plan view of an anhydrous ammonia implement frame and a trailing anhydrous wagon, with an alternate wagon position partially shown in phantom.

Referring first to FIG. 1, reference numeral 10 generally designates a frame for an agricultural implement, such as, in the illustrated embodiment, an applicator for anhydrous ammonia. The ammonia is stored under pressure in a tank designated 11 which is mounted on and carried by a wagon seen partially in phantom at 12. The wagon 12 is supported by four wheels 13, and it includes a draft member or tongue 14, the forward end of which includes a hitch 15 for connecting to the rear of the implement frame 10, in a manner to be described, and which permits the wagon tongue 14 to pivot about a vertical hitch axis 16 as the implement turns. The wagon tongue may also pivot vertically about a horizontal axis at its connection to the wagon reach, as is known.

The implement frame 10 includes a forwardly extending draft section generally designated 18 and including first and second side frame members 19, 20 which extend rearwardly in a diverging manner as illustrated and as known in the art. A hitch clevis 21 is mounted to the forward end of the implement tongue 18 and adapted to be conventionally mounted to the drawbar of a tractor for pulling the implement.

The illustrated implement frame has a center section generally designated 23 and left and right side sections 24, 25 or "wings" as they are known in the art.

The improvements provided in the wing sections 24, 25 will be described in further detail below, but the wings are otherwise conventional in that they may be moved to a transport position by being rotated, under power, about respective horizontal axes 26, 27. Each wing is further provided with a support wheel designated 28, 29, and a hydraulic cylinder (not shown) is provided for each support wheel 28, 29 for raising the wings in unison with the center section 23 when it is desired to raise the implement frame to raise the applicators above the soil, as at the end of a row where the implement must be turned, or in crossing a waterway, or setting the implement for road transport.

A plurality of conventional fertilizer applicators (or "knives" as they are sometimes called) 30 are mounted in uniform laterally-spaced relation along the front and rear mounting bars of the wings and the central section of the frame; and it will be appreciated that the distribution of anhydrous ammonia from the tank 11 to each of the individual applicators 30 is also conventional except as described below.

The center section 23 of the implement frame 10 is supported by wheels designated 32, 33 respectively. The center frame section 23 is rectangular in shape, including a forward tubular frame member 35, a similar rear tubular frame member 36, left and right side frame members 37, 38 which have their ends welded respectively to the forward and rear frame members 35, 36, and intermediate frame members 39, 40 which are similarly welded between the forward and rear frame members 35, 36 as seen in FIG. 1. The frame members 35-40 form a rigid, box-like or rectangular central frame section 23. As will be apparent, in use, the implement is intended to travel upwardly in the plane of the page of FIG. 1 as determined by the orientation of the support wheels 28, 29, 32 and 33.

Referring now to FIGS. 1 and 2, a hitch frame generally designated 42 is mounted beneath the center section 23 of the implement frame. As seen best in FIGS. 1 and 4, the hitch frame 42 includes left and right elongated tubular frame members 43, 44 which are connected together at their rear ends by a transverse frame member 45. The forward ends of the elongated frame members 43, 44 are pivotally mounted beneath the forward frame member 35 of the central section frame 23. The connection is similar for each member, and is best seen in FIGS. 2 and 3.

A pair of mounting plates are welded to the bottom of the forward frame member 35, one such mounting plate being designated 47 in FIG. 2; and a pin 48 is then placed between the mounting plates 47 and through the forward end of the associated side hitch frame member (member 44 in this case). Thus, the hitch frame is free to rotate about its forward pivotal connection relative to the center section frame, and the hitch frame is located beneath the center section frame so that as the implement is raised as seen in FIG. 3, the hitch frame 42 extends downwardly and rearwardly from its forward pivotal connection at 48.

It will be observed that the pivotal connection of the hitch frame is located well forward of the support wheel 33, and includes two laterally spaced pivot or hinged locations—one at the forward ends of each of the frame members 43, 44. Thus, the hitch frame 42 is in the form of a rigid gate which may swing vertically about its forward pivots. Because the pivots are laterally displaced, there is an increased resistance against lateral movement of the tail end of the hitch frame relative to the implement frame. Although the hitch frame is shown in the form of a rectangular gate in the illustrated embodiment, persons skilled in the art will be able to substitute similar structures. For example, the hitch frame could be in the form of a "V" when viewed from above and looking in the direction of travel so that the two side frame members would converge from the forward pivot mountings to the rear where the wagon hitch would be located in a position similar to that in the illustrated embodiment.

Each of the support wheels 32, 33 for the center frame section is mounted in a similar fashion, and only one such mounting, therefore, need be described further. Referring then to FIG. 2 for the right support wheel 33 of the center section, its axle is mounted to a wheel pedestal 50 which is in the form of a dog leg (see FIGS. 2 and 3). The other end of the wheel pedestal is pivotally mounted at 51 beneath the rear frame member 36 of the center frame section, the pivot pin being received in the wheel pedestal 50 and mounted in a pair of laterally spaced brackets welded to the bottom of the frame member 36, one of the brackets being seen at FIG. 2 and designated 52.

The hydraulic cylinder 53 has its rod end pivotally connected to a mounting bracket 54 welded to the wheel pedestal 50, and its butt end pivotally connected at 55 to a mounting bracket 56 welded to the rear frame member 36. When the hydraulic cylinder 53 is extended, as seen in FIG. 3, the center frame section 23 is raised, and the wheel pedestal 50 is rotated to a more upright position. This leaves the hitch frame 44 free to rotate about the pivot 48, however, the hitch frame 44 is supported at an intermediate location, identified by reference numeral 58 (see FIG. 4), as will now be described. This intermediate support cooperates with the size and arrangement of the hitch frame and the location of the forward pivot 48 to provide the self-leveling feature mentioned above. As illustrated in FIGS. 2 and 3, a comparison of the height dimension identified by arrow A (representing the height of the wagon hitch above the ground when the implement frame is in a lowered or use position) and the corresponding dimension indicated by arrow B in FIG. 3 (which represents the height of the wagon hitch when the implement frame is raised), it can be seen that the height of the hitch is substantially the same for both conditions, although the hitch is slightly higher, but by only a small amount, for the raised position.

Figure 4:
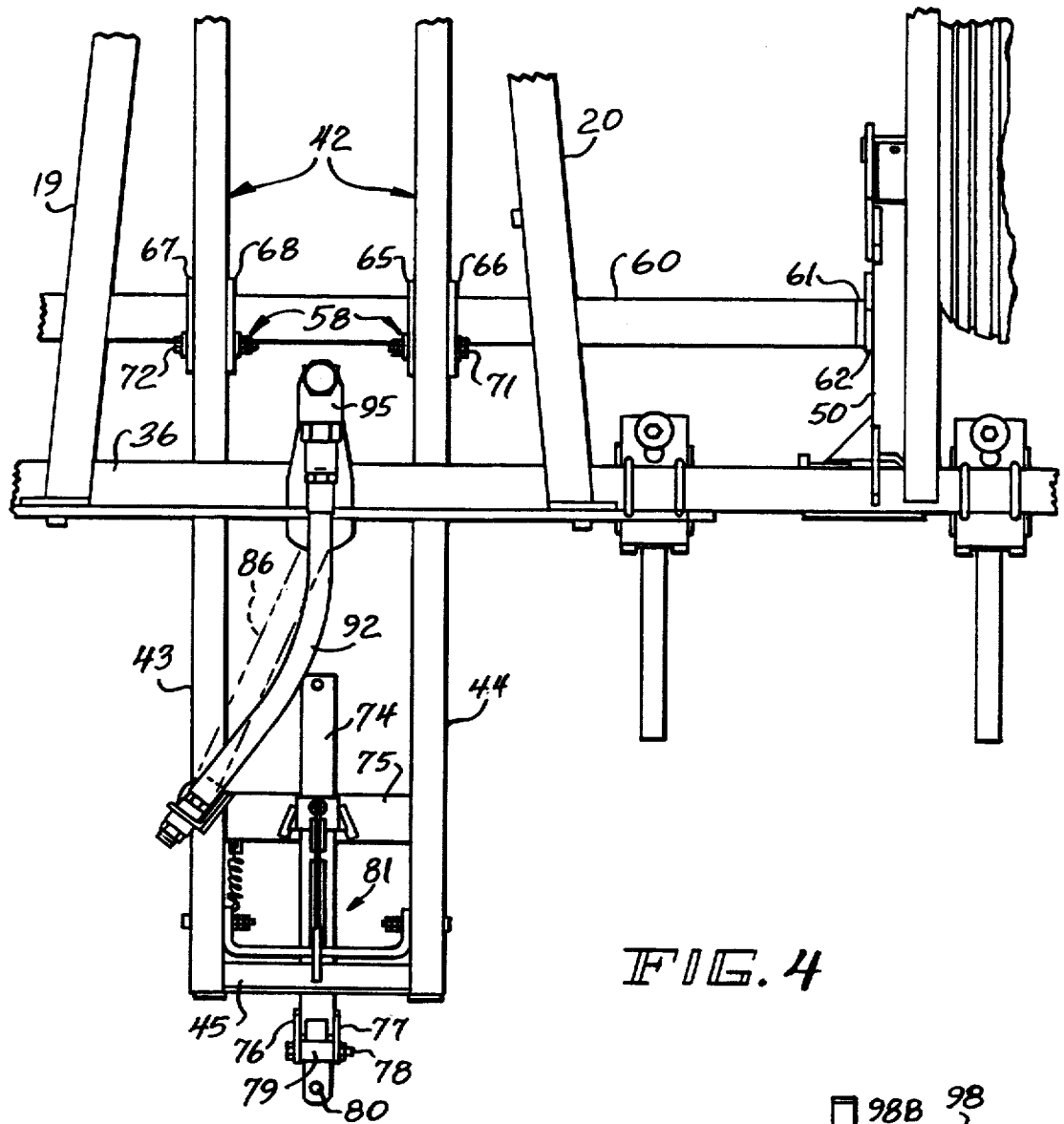
FIG. 4 is a fragmentary top plan view of the rear central portion of the implement frame showing the rear end of the improved hitch section and the improved swing arm for the coupling of the tank distribution hoses.

Turning now to FIGS. 1 and 4, a tube 60 extends transversely of the center frame section and is mounted at its right end to wheel pedestal 50 by means of plates 61, 62, plate 61 being welded to the butt of the tube 60 and plate 62 being welded to the inside surface of the wheel pedestal 50, and the two plates 61, 62 then being joined together. The left end of the transverse tube 60 is similarly mounted to the left wheel pedestal 63 for the left side support wheel 32 for the center frame section 23. Thus, as the hydraulic cylinder (such as the one shown at 53 in FIGS. 2 and 3) raises the implement frame, the transverse tube 60 is also raised (compare FIGS. 2 and 3); but the intermediate location 58 of the hitch frame is lowered relative to the rear end of the main frame.

Turning now to FIG. 4, the means for supporting the hitch frame at the intermediate location 58 will now be described. A first pair of laterally spaced brackets 65, 66 are welded to the tube 60 to straddle the frame member 44 of the hitch frame; and a similar pair of brackets 67, 68 are welded to the tube 60 to straddle the frame member 43. As best seen in FIGS. 2 and 3 for the right side plate 66, each of the plates 65–68 has a slot formed near the top, such as that designated 69 for the plate 66.

A bolt 71 extends through the slots in the plates 65, 66 and through an aperture in the frame member 44. A similar bolt 72 extends through corresponding slots in the plates 67 and 68, and through the elongated frame member 43. Thus, the frame members 43, 44 are supported at the intermediate locations 58 by the bolts 71, 72, which, in turn, are supported by the brackets 65, 66 and 67, 68 respectively. However, the bolts 71, 72 are permitted to move along slots in their support brackets, and they are guided by the slots. By comparing FIGS. 2 and 3 it can be seen that the bolt 71 moves from the rear of the slot 69 when the implement is in a lowered position (FIG. 2) to a forward position in the slot 69 as the implement is raised (FIG. 3).

To summarize, the forward end of the hitch frame is pivotally connected to a forward, central location on the center section of the implement frame; and the hitch frame or gate is supported and guided at an intermediate location by the transverse tube 60 which is mounted between the wheel pedestals, and the brackets and bolts just described. This structure forms a guide means for an intermediate location of the hitch frame which is responsive to the raising of the implement frame (and the forward end of the hitch frame) to maintain the wagon hitch at a substantially constant height, independent of the height of the implement frame. Obviously, many of the dimensions, such as the length of the hitch frame, the fore-to-aft dimension of the center section frame, the location and structure of the wheel supports may be varied, but persons skilled in the art will be able to incorporate a wagon hitch having a self-leveling feature to a wide variety of such dimensional variations. Moreover, whereas in the illustrated embodiment the intermediate section of the hitch frame was supported by the transverse tube 60 mounted to wheel pedestals, persons skilled in the art will appreciate that other support means could be designed which could be mounted to the implement frame and cause the intermediate support of the hitch frame to be lowered relative to the implement frame and the implement frame is raised. An equivalent function and result could thus be obtained.

Referring now particularly to FIG. 4, a drawbar 74 is mounted to a plate 75 extending between the elongated hitch frame members 43, 44 and the transverse rear hitch frame member 45. At the rear of the drawbar 74 a pair of plates 76, 77 are welded to form a trunnion receiving a transverse, horizontal bolt 78 which secures a drawbar bracket 79 to the drawbar 74. An opening 80 in the drawbar bracket 79 receives a pin to secure the wagon hitch 15 (FIG. 1) to the drawbar 74, and thus the hitch frame. The bolt 78 permits the drawbar bracket 79 to rotate about a transverse horizontal axis relative to the drawbar 74; and this is advantageous, for example, when the implement passes through a waterway and is travelling uphill, whereas the wagon may be directed downhill. The mounting and adjusting mechanism for setting the drawbar, generally designed reference numeral 81 in FIG. 4 may be conventional.

Figure 5:
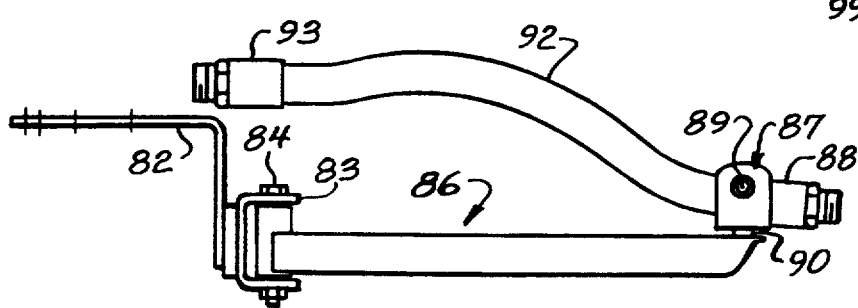
FIG. 5 is a side view of the improved swing arm and coupling hose.

Referring now to FIGS. 4 and 5 in particular, a mounting bracket 81 in FIG. 4 is mounted to the rear frame member 36 of the central frame section of the implement; and a U-shaped trunnion bracket 83 is welded to the rear of the mounting bracket 82 for receiving a vertical bolt 84 which serves as a pivot for a swing bracket generally designated 86. A hose bracket 87 is mounted to the rear of the swing arm 86. The bracket 87 is conventional and permits the male portion 88 of a conventional break-away coupling to achieve a universal motion. That is, the bracket 87 actually includes two L-shaped brackets, mounted together by a horizontal pivot pin 89. One bracket carries the male connector 88, and the other (i.e., the one seen in FIG. 5) is mounted to the distal end of swing arm 86 by a vertical pivot pin 90. The male connector 88 is mounted to the rear end of a coupling hose 92, the forward end of which is provided with a similar connection 93 which is received directly in a conventional pressure regulator (not shown) which is mounted to a regulator bracket 95 (FIG. 4).

An observation of FIGS. 4 and 5 indicates that the length of the swing arm 86 is less than the length of the coupling hose 92 between the regulator and the break-away coupling 88 to which the hose from the ammonia tank 11 extends. This feature, together with the provision of the swing arm 86 permit the forward end of the hose (namely, coupling 93) to be in alignment with the regulator and the rear end of the hose (namely, connector 88) to be in alignment with the supply hose from the wagon for substantially all lateral positions of the tank. For example, when the tank is located to the left of the implement, the swing arm rotates clockwise about the pivot 84, but because the coupling hose 92 is longer than the swing arm 96, it bends about to the right side of the swing arm, causing better alignment both at its forward and its rear ends. A corresponding alignment occurs when the wagon is to the right side of center, as seen in FIG. 1, with the coupling hose 92 assuming a mirror image position relative to the swing arm 86 as compared with that shown in FIG. 4.

When the wagon is directly behind the implement, the coupling hose 92 bows upwardly as seen in FIG. 5, while maintaining a desirable alignment at both its front and its rear. This feature is deemed important because, in the past, when the implement turned sharply in one direction, such as at the end of a row, the break-away coupling (male and female portions) would extend fore-and-aft, whereas the tank hose would be pulling the female portion to the side. This would cause a binding which would greatly increase the force necessary to disconnect the coupling.

Figure 6:
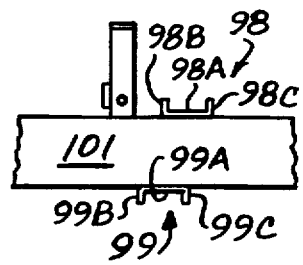
FIG. 6 is a fragmentary front view of one of the side wings of the implement of FIG. 1 showing the use of top and bottom strengthening channels.

As best seen in to FIGS. 1 and 6, as a means of efficiently strengthening the frames of the side wing sections, the illustrated system includes a pair of U-shaped channels, one being designated 98, and the other being designated 99 in FIG. 6. These channels are mounted between the forward and rear transverse frame members 100, 101 of the wing section (see FIG. 1); and they are laterally offset relative to each other. The channel 98 includes a back or flat portion 98A and upwardly extending stiffener flanges 98B, 98C. Similarly, the channel 99 includes a central back 99A and upstanding stiffener flanges 99B and 99C. The strengthening effect of the combined channels 98, 99 is determined by the distance between the stiffeners 98C and 99B. This dimension is greater than the width of either channel individually, and it provides a greater section for strengthening the rectangular wing frame arrangement, by adding strength to resist "parallelogramming" or "racking" of the wing frame.

Having thus disclosed in detail a preferred embodiment of the invention, persons skilled in the art will be able to modify certain of the structure which has been illustrated and to substitute equivalent elements for those disclosed while continuing to practice the principle of the invention; and it is, therefore, intended that all such modifications and substitutions be covered as they are embraced within the spirit and scope of the appended claims.

I claim:

1. In an agricultural implement having a frame, at least first and second support wheels, a wheel pedestal for each support wheel connected to said frame, said implement being adapted to be pulled by a tractor and to pull a wheeled vehicle having a draft tongue, said implement including power means for adjusting said implement between a raised transport position and a lowered use position by rotating said wheel pedestals relative to said frame, the improvement comprising:
an elongated hitch frame having forward and rear ends;
first mounting means for pivotally mounting said forward end of said hitch frame to said implement frame to permit the rear end of said hitch frame to rotate downwardly relative to said implement frame about a horizontal axis transverse of the direction of travel of said implement;
a wagon hitch mounted to said rear end of said hitch frame and adapted to hitch to said draft tongue of said wheeled vehicle;
and guide means carried by said wheel pedestals for supporting said hitch frame at a location intermediate of said forward and rear ends thereof for lowering said intermediate location of said hitch frame relative to said implement frame in response to the raising of said implement frame; whereby as said implement frame is raised, said guide means lowers said hitch frame at said intermediate location, and said hitch frame rotates about said first mounting means and maintains said wagon hitch at a substantially uniform distance above ground for both the raised and lowered positions of said implement frame.

2. The apparatus of claim 1 wherein said horizontal transverse axis about which said implement frame may rotate is located forward of said support wheels for said implement frame.

3. The apparatus of claim 2 wherein said power means includes for each wheel pedestal an hydraulic cylinder having one end mounted to an associated wheel pedestal and the other end mounted to said implement frame whereby as said hydraulic cylinders are extended, said implement frame is raised and said wheel pedestals are rotated to a more upright position; said guide means including a transverse member mounted between said first and second wheel pedestals and including a member connected to said hitch frame for coupling the same to said transverse member at said intermediate location, whereby as said implement frame is raised, said transverse support member is also raised in a controlled motion to support said hitch frame at said intermediate location.

4. The apparatus of claim 3 wherein said transverse member includes a plate having a slot receiving a pin mounted to said hatch from said pin and slot being constructed and arranged such that as said wheel pedestals rotate between the raised and lowered positions, said pin rides in said slot to control the elevation of said intermediate location of said hitch frame during raising and lowering of said frame.

5. The apparatus of claim 1 wherein said hitch frame includes first and second elongated side frame members extending in the direction of travel, and wherein said first mounting means mounts the forward ends of said elongated side frame members respectively to a portion of said implement frame forward of said support wheels, said apparatus characterized in that as said implement frame is raised by said power means, the aft portion of said hitch frame rotates downwardly relative to said implement frame and said guide means controls the rotation of said hitch frame away from said implement frame in a manner such as to maintain said wagon hitch at said substantially uniform distance above ground for both the raised and lowered positions of said implement frame.

6. In a drawn agricultural implement having a frame; a hitch at a forward portion of said frame; support wheels including a wheel pedestal for a support wheel connected to said frame; and power means for adjusting said implement frame between a raised transport position and a lowered use position by rotating said wheel pedestal, the improvement comprising:
an elongated hitch frame having forward and rear ends;

first mounting means for pivotally mounting said forward end of said hitch frame to said implement frame to permit the rear end of said hitch frame to rotate downwardly relative to said implement frame about a horizontal axis transverse of the direction of travel of said implement, said transverse horizontal axis being located forward of said wheel pedestal and rearward of said hitch;

a wagon hitch mounted to said rear end of said hitch frame and adapted to hitch to a draft tongue of a wheeled trailing vehicle;

and guide means supporting said hitch frame at a location intermediate of said forward and rear ends thereof for lowering said intermediate location of said hitch frame relative to said implement frame in response to the rotation of said wheel pedestal as said implement frame is raised, whereby as said implement frame is raised, said guide means lowers said hitch frame at said intermediate location, and said hitch frame rotates about said first mounting means and maintains said wagon hitch at a substantially uniform distance above ground for both the raised and lowered positions of said implement frame.

* * * * *

UNITED STATES PATENT AND TRADEMARK OFFICE
CERTIFICATE OF CORRECTION

PATENT NO. : 5,343,958
DATED : September 6, 1994
INVENTOR(S) : Gaylen Kromminga, et al It is certified that error appears in the above-indentified patent and that said Letters Patent is hereby corrected as shown below:

Column 8, line 39, claim 4, delete "hatch from" and insert —hitch frame—.

Signed and Sealed this

Sixteenth Day of May, 1995

Attest:

BRUCE LEHMAN

Attesting Officer          Commissioner of Patents and Trademarks